United States Patent [19]

Ryder et al.

[11] Patent Number: 4,713,739
[45] Date of Patent: Dec. 15, 1987

[54] CLAM SHELL GEAR BOX HOUSING AND RETAINER

[75] Inventors: Francis E. Ryder; Stephen P. Lisak, both of Arab, Ala.

[73] Assignees: Ryder International Corporation, Arab, Ala.; Textron, Inc., Providence, R.I.; a part interest

[21] Appl. No.: 875

[22] Filed: Jan. 6, 1987

[51] Int. Cl.[4] .............................................. B60Q 1/08
[52] U.S. Cl. ...................................... 362/424; 362/69; 362/273; 362/289
[58] Field of Search ................... 362/66, 270, 69, 273, 362/272, 289, 285, 424, 418

[56] References Cited

U.S. PATENT DOCUMENTS

| 1,830,355 | 11/1931 | Farr | 362/424 |
|---|---|---|---|
| 4,271,456 | 6/1981 | Dick | 362/66 |
| 4,309,740 | 1/1982 | Takata | 362/66 |
| 4,320,441 | 3/1982 | Matsushiro | 362/69 |
| 4,419,721 | 12/1983 | Gregoire | 362/424 |
| 4,524,407 | 6/1985 | Igura | 362/66 |

FOREIGN PATENT DOCUMENTS

| 0063532 | 4/1983 | Japan | 362/66 |
|---|---|---|---|
| 0153635 | 9/1984 | Japan | 362/66 |
| 0195441 | 11/1984 | Japan | 362/66 |
| 2109082 | 5/1983 | United Kingdom | 362/66 |

Primary Examiner—Craig R. Feinberg
Assistant Examiner—David A. Okonsky
Attorney, Agent, or Firm—Trexler, Bushnell, Giangiorgi & Blackstone, Ltd.

[57] ABSTRACT

An adjusting mechanism for a headlamp or the like, comprises a first housing piece and a second housing piece defining first and second orthogonally disposed gear-receiving bores when assembled. The bores intersect at a peripheral location with respect to each other so as to receive respectively a drive gear member and an adjusting gear member disposed with the gear members being engageable at the locations where the bores intersect. The housing pieces receive and guide a drive shaft for engagement with the drive gear and extending outwardly from the housing. The second housing piece receives an adjusting shaft for engagement with the adjusting gear and extending from the housing for engagement with a headlamp or the like, such that by rotation of the drive gear members, rotational movement will be imparted to the adjusting shaft to effect adjustment of a headlamp assembly or the like. In accordance with another aspect of the invention, the adjusting mechanism further includes a retainer clip member and cooperating structure on the retainer clip member and on the two housing pieces respectively for maintaining the latter in an assembled condition with the retainer member. The retainer member further includes structure for aligning the adjusting shaft member for engagement with the adjusting gear.

21 Claims, 11 Drawing Figures

CLAM SHELL GEAR BOX HOUSING AND RETAINER

BACKGROUND OF THE INVENTION

This invention relates generally to the automotive arts and more particularly to an adjusting mechanism for an automobile headlamp assembly. Still more particularly, the invention relates to novel and improved gear box housing and retainer clip members for use in such an adjusting mechanism.

Mechanisms for vertical and horizontal adjustment or "aiming" of automobile headlamps have been provided for sealed beam-type automotive headlamps for some time. Generally speaking, such headlamps were individually adjustable with independent adjusting screws or the like, by driving the same with a suitable mating tool. Often, these adjusting screws were accessible only with some difficulty or upon removal of certain trim or bezel components of the headlamp assembly. Problems have been encountered in that these adjusting screws became corroded or otherwise fouled with rust and/or road grime, rendering the adjustment procedure time-consuming and difficult, or necessitating removal and replacement of a number of parts.

It has heretofore been proposed to utilize a novel type of adjusting mechanism which is mounted interiorly of the vehicle and which can be easily and readily operated to adjust vertical and/or horizontal positioning or "tilting" of the headlamps to achieve the desired aiming thereof. Such a mechanism would be independent of the headlamp members or other headlamp assemblies, such that it could be used with any of a wide variety of different headlamp shapes, sizes and configurations, interchangeably.

One such arrangement takes the form of a two-piece plastic "clam shell" type of housing which receives a pair of bevel or crown gear members arranged at right angles for engagement of gears along their respective edges so as to convert horizontal rotational motion to vertical rotational motion or vice versa. One of these gears is coupled to an elongate drive shaft member which may be coupled to suitable rotary drive means at its remote end. The other of the gears is coupled to an elongate threaded shaft member which is arranged to axially advance and retract a portion of the headlamp relative to the gear and housing in response to rotation of its associated gear. Accordingly, the rotary motion of the first or drive shaft is converted to generally linear or axial motion of the headlamp portion coupled to the second or adjusting shaft.

Another particularly novel and useful arrangement is a one-piece type of gear housing as shown in our prior U.S. application Ser. No. 794,092, filed Oct. 31, 1985 now abandoned and a continuation-in-part application, Ser. No. 851,331, filed Apr. 14, 1986 now U.S. Pat. No. 4,674,018. One of the objects of the novel one-piece gear housing arrangement in our above-referenced applications was to avoid a number of problems previously encountered with two-piece "clam shell" types of housings. In prior art two-piece or clam shell type housing arrangements, the gear members were often inadequately journaled, such that they would rattle and often fail to smoothly rotate and function properly. Moreover, the seam or parting line in the two-piece or clam shell type of housing often permitted the entry of moisture, road grime, grease and other contaminants which would tend to foul the operation of the gears over a period of time. Moreover, since the parting or joining line of the two-piece housing of necessity would define a plane which included the axis of at least one of the gears and its associated drive shaft or adjusting shaft member, any side loads occuring during operation of the members would tend to part or separate the housing halves or pieces. Such separation will of course further hamper proper journaling of the gears, the proper inter-engagement thereof for rotation and further aggravate the problem of access of moisture, grime, grease and other contaminants.

Yet other headlamp adjusting mechanisms have been proposed which are relatively complex and expensive. Examples of some of these latter mechanisms are shown in U.S. Pat. Nos. 4,271,456; 4,309,740 and 4,524,407.

The present invention is an improvement of the above prior art and in particular of the above two-piece or clam shell type of gear housing. In this regard the housing member of the invention is a two-piece clam shell type of member which is advantageously configured with additional means for maintaining the desired journaled condition of the gears in engagement with each other, with novel sealing means for avoiding the ingress of moisture, dirt, grease and the like, and with further additional strengthening members or means to resist parting or separating of the housing halves or parts in the presence of side loads during operation.

As an additional matter, many prior art gear box housings require a further retainer member or bracket, often in the form of a metal stamping for retaining at least one of the drive shaft and/or adjusting shaft members in the desired engaged condition with its associated gear member. However, use of this separate metal retaining clip gives rise to a number of additional problems. Initially, some of the dimensioning of the retaining clip was critical, in order to maintain the desired proper alignment of the adjusting and/or drive shaft member with its associated gear within the housing. This desired alignment often is difficult to achieve and maintain in practice with prior art types of brackets or retainer members.

Moreover, the provision of a separate retainer member provided an additional loose piece for assembly. That is, in relatively high volume, high speed automotive assembly lines, it is desirable to minimize the number of separate pieces which must be assembled. This is desired in order to optimize the assembly procedure and to avoid errors therein, such as misaligned or poorly assembled pieces, lost or missing pieces, or the like.

Finally, the metal retainer was often an expensive, brass or plated piece, thus further adding to the expense of the headlamp adjusting assembly. In high volume automotive assembly operations, an increase of even a few cents in the price of a given sub-assembly can add substantially to the overall cost of the operation and hence cost of the manufactured vehicles.

In accordance with another aspect of our invention, our novel and improved headlamp adjusting mechanism includes not only the clam shell gear housing discussed above, but also a novel and improved retainer member. Preferably, our retainer is molded as a one-piece integral member from a plastics material, and is engageable in a preassembled condition with the clam shell housing and ready to engage the adjusting or drive shaft to be retained thereby.

BRIEF DESCRIPTION OF THE DRAWINGS

The features of the present invention which are believed to be novel are set forth with particularity in the appended claims. The organization and manner of operation of the present invention, together with further objects and advantages thereof may best be understood by reference to the following detailed description taken in conjunction with the accompanying drawings in which like reference numerals identify like elements. It should be noted, however, that the drawings illustrate preferred embodiments of the invention and the invention is by no means limited to these embodiments.

DETAILED DESCRIPTION OF THE ILLUSTRATED EMBODIMENT

Figure 1:
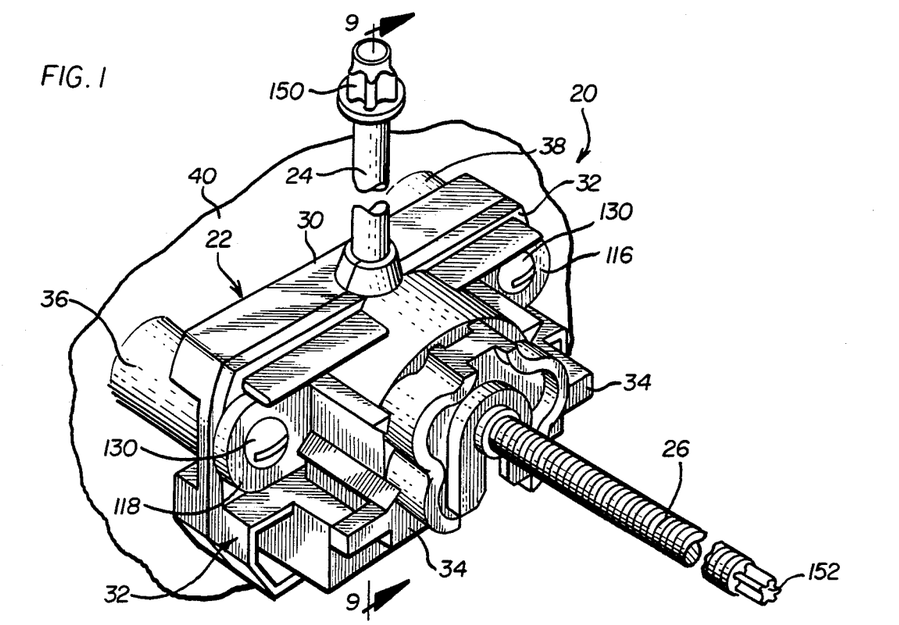
FIG. 1 is a top and side perspective view of a fully assembled adjusting mechanism for a headlamp or the like, in accordance with the present invention, and mounted to suitable mounting posts or means in an automobile or other vehicle for achieving the desired headlamp adjustment.
Figure 2:
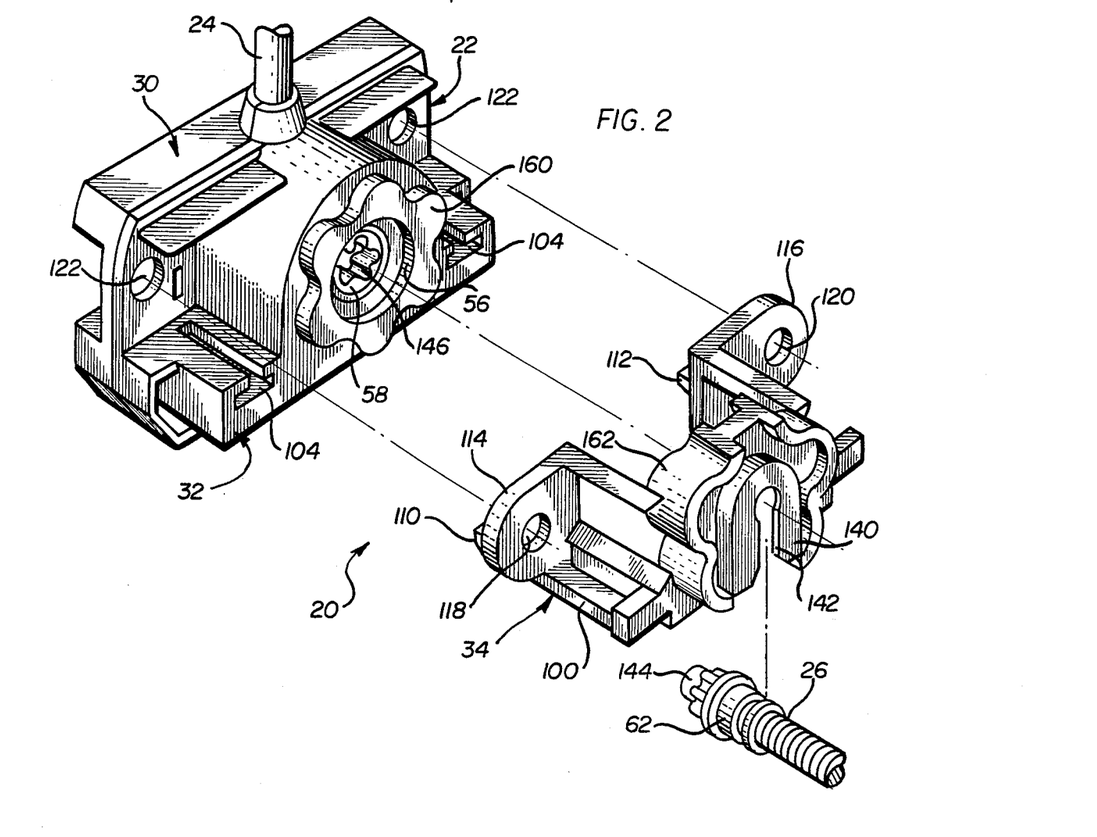
FIG. 2 is an exploded perspective view, similar to FIG. 1, illustrating a retainer clip member in accordance with one aspect of the invention and the manner of its engagement with an adjusting shaft member for aligning the same with the gear box housing.

Referring now to the drawings and initially FIGS. 1 and 2, an adjusting mechanism for a headlamp or the like is designated generally by the reference numeral 20. Generally speaking, this adjusting mechanism 20 includes a gear box housing 22 which mounts a pair of crown or bevel gears for transmitting motion between a generally vertically extending drive shaft 24 and a generally horizontally extending adjusting shaft 26. In the illustrated embodiment, the adjusting shaft 26 is threaded as indicated, for further engagement with a complementary threaded portion of a headlamp assembly or the like, so as to axially advance and retract the same relative to adjusting shaft 26 as the adjusting shaft 26 is rotated. Accordingly, the desired linear movement of a given portion of a headlamp housing portion for achieving a desired adjustment of the headlamp housing or "aiming" of the headlamp is accomplished by adjusting shaft 26 in response to rotation of drive shaft 24. It will be noted that such rotation and corresponding adjustment is bidirectional in nature.

In accordance with the present invention, the gear box housing 22 comprises a clam shell or two piece assembly. This assembly 22 comprises a first or drive gear-receiving housing half or piece 30 and a second or adjusting gear-receiving housing half or piece 32. In order to engage and mount the adjustment shaft 26 with the gear box 22, an additional retainer clip or mounting member 34 is also provided. As will be more fully explained hereinbelow, both the retainer clip 34 and housing 22 are mounted to suitable mounting posts 36, 38 or the like provided therefor in a vehicle frame, at some suitable location for adjustment of the headlamp assembly as desired. In the illustrated embodiment the mounting members or posts are illustrated projecting from a surface 40.

As discussed hereinabove, a number of problems have arisen in prior art two-piece or clam shell types of housing, as well as with prior art types of retainer clips. Briefly, with such two-piece housings, the gear members were often inadequately journaled. tending to rattle about within the housings. Moreover, since the parting or joining line of the two pieces necessarily defines a plane including the axis of at least one of the gears and associated drive or adjusting shaft 24, 26, loading occurring during operation would tend to part or separate the housing halves or pieces. This separation further contributes to the unstable mounting of the gears within the housing, as well as aggravating the problem of ingress of moisture, grease, or other contaminants through this parting or joining line.

Advantageously, the housing pieces 30, 32 and retainer clip 34 of the present invention include a number of novel features for obviating these problems.

Figure 9:
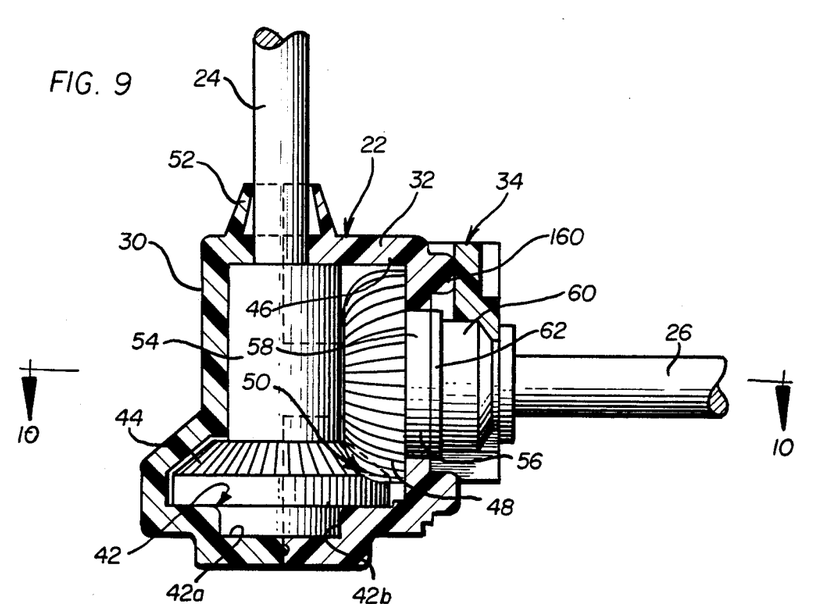
FIG. 9 is a sectional view taken generally in the plane of the line 9—9 of FIG. 1.
Figures 10, 11:
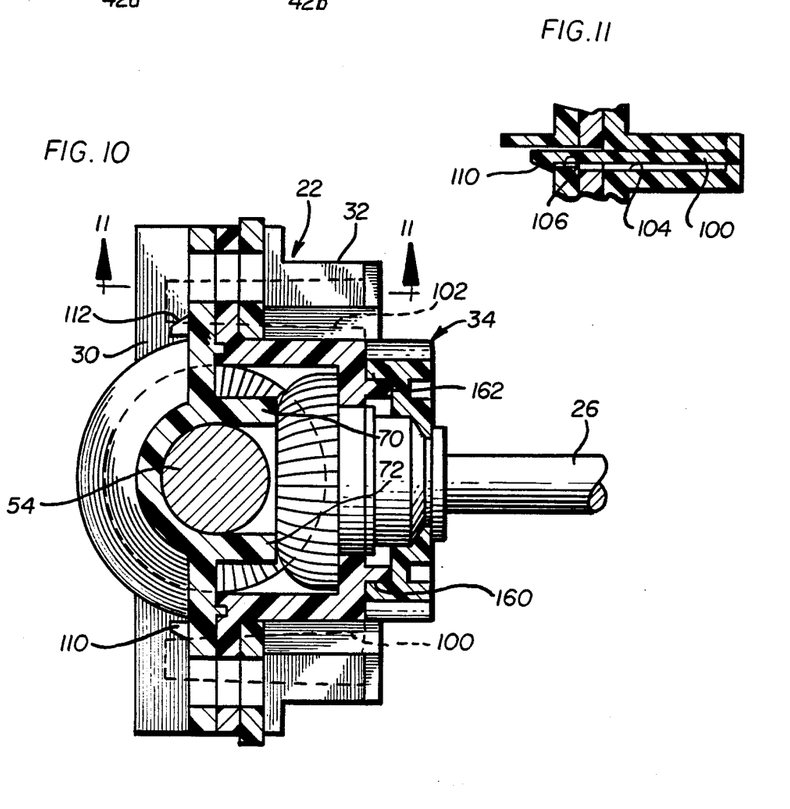
FIG. 10 is a sectional view taken generally in the plane of the line 10—10 of FIG. 9.
FIG. 11 is a partial sectional view taken generally along the line 11—11 of FIG. 10.

Referring now also to FIGS. 9 and 10, the first and second housing pieces define complementary parts 42a, 42b of a first gear-receiving bore 42, which in operation rotatably journals a drive gear member 44. Similarly, the second housing piece 32 also defines a second gear-receiving bore 46 which rotatably journals a second or adjusting gear member 48. In the illustrated embodiment, it will be seen that the gear-receiving bore 32 has substantially half thereof formed in housing piece or half 30 and the other half thereof formed in housing piece 32 as indicated by reference numerals 42a and 42b. In the illustrated embodiment, these bores 42 and 46 intersect at a peripheral location as indicated at reference numeral 50, so as to receive respectively the drive gear member 44 and adjusting gear member 48 engaged at the locations where the first and second gear-receiving bores intersect. Preferably the two gears 44 and 48 comprise crown or bevel type gears which are generally orthogonally disposed and engaged so as to generally convert rotational motion in one plane to rotational motion in a second, orthogonally disposed plane.

The two housing pieces also define a drive shaft receiving means or collar 52 for receiving and guiding the drive shaft 24 into engagement with the drive gear 44. Preferably, the drive gear 44 is provided with an elongate, upwardly extending neck portion 54, configured for engaging and receiving an end portion (not shown) of drive shaft 24 so as to impart rotational force directly from drive shaft 24 to gear 44. Hence, the drive shaft 24 engages and drives the drive gear 44 and extends outwardly from the housing 22.

Similarly, the second housing defines an adjusting shaft-receiving opening 56, which is generally coextensive with and opens outwardly of the gear-receiving bore 46 for receiving the adjusting shaft 26 in engagement with the adjusting gear 48. In the illustrated embodiment, the adjusting gear 48 has a relatively short, reduced diameter neck or collar portion 58 which extends into a bearing surface defined therefor in the opening 56. Accordingly, a mating end portion 60 of adjusting shaft 26, which will be more fully described later herein includes an enlarged diameter shoulder portion 62 for engagement with the outer face of neck 58. Complementary mating drive portions (see FIG. 2) are preferably formed in the neck 58 and on the facing and engaged end of shaft engaging portion 60, to assure that rotational motion is imparted directly from gear 48 to shaft 26, which extends outwardly from the housing to engage a suitable portion of the headlamp or the like for adjustment or aiming thereof.

Accordingly, the foregoing arrangement is such that upon rotation of the drive shaft 24, rotational movement will be imparted to adjustment shaft 26 in response to rotation of the first and second gear members when engaged. This rotational movement is usable to effect adjustment of a headlamp assembly or the like, for example by providing a thread on shaft 26, as illustrated in FIGS. 1 and 2 to impart generally linear motion to the headlamp assembly or a portion thereof as desired for adjustment or aiming thereof.

Figure 6:
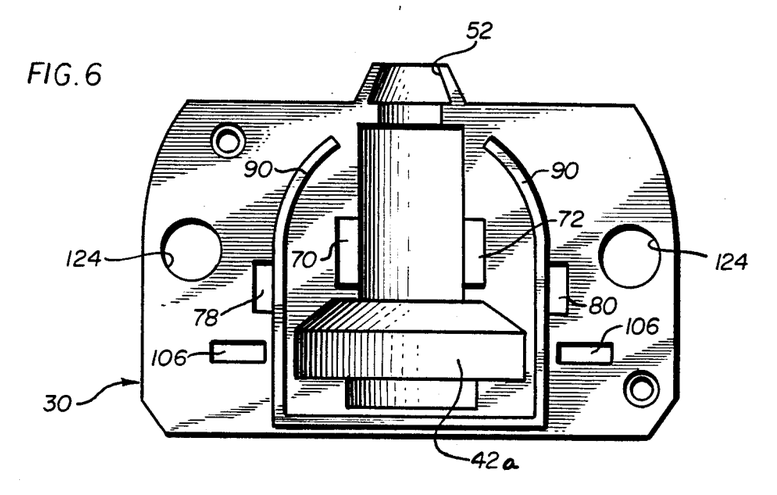
FIG. 6 is a top or inside view of the other, or drive gear-mounting housing piece of the two-piece housing assembly of the invention.
Figure 7:
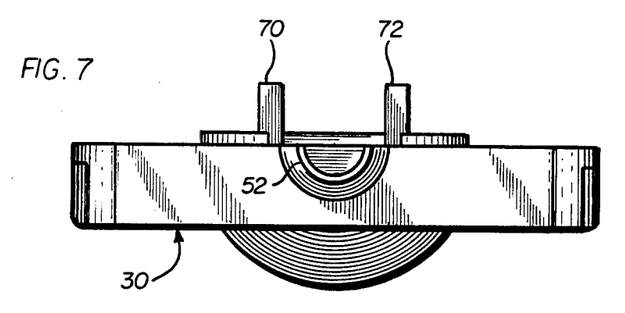
FIG. 7 is an end plan view of the housing piece of FIG. 6.
Figure 8:
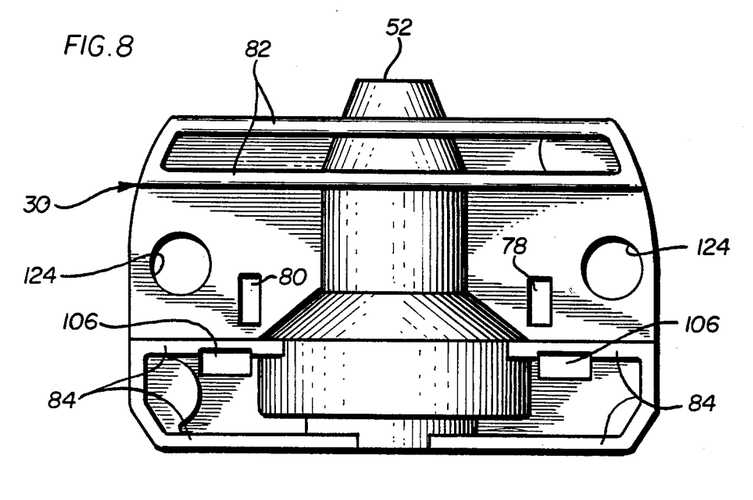
FIG. 8 is a bottom or outside plan view of the housing piece of FIGS. 6 and 7.

In accordance with a feature of the invention and referring also to FIGS. 6 through 8, the first housing piece 30 also includes a gear supporting or retainer wall means 70, 72 which extend in the direction of the gear-receiving bore 46 for holding the adjusting gear member 48 in place therein. In the illustrated embodiment, these wall means 70 and 72 are generally parallel and spaced apart projecting members located at generally diametrically opposed locations relative to the adjusting gear-receiving bore 46. Advantageously, these retainer walls 70 and 72 also engage the neck 54 of gear 44 to either side thereof. Accordingly, the retainer walls 70 and 72 advantageously aid in maintaining both gears 44 and 48 securely journaled within the bores 42 and 46 provided therefor in the housing 22.

Figure 3:
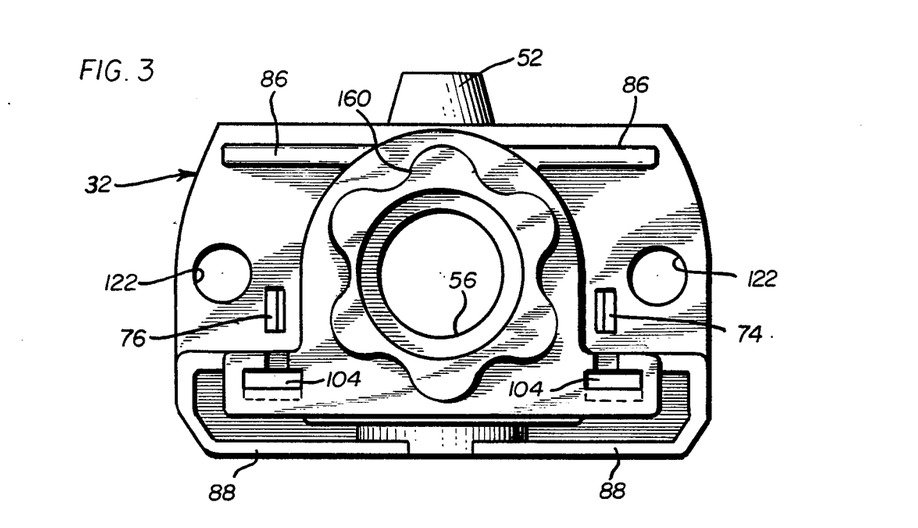
FIG. 3 is a front or outside elevation of an adjusting gear-receiving housing piece of the two-piece housing of the invention.
Figure 4:
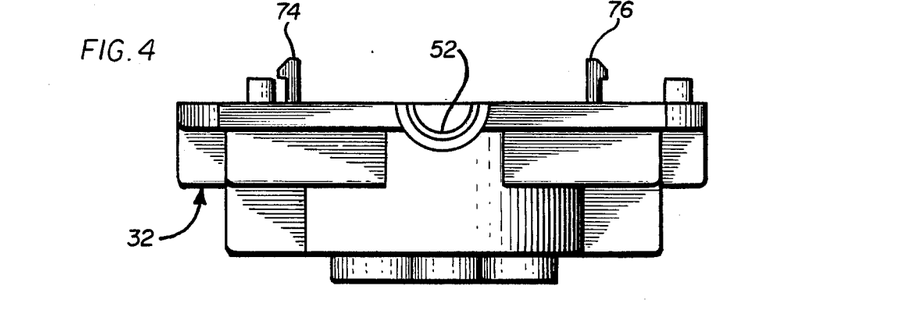
FIG. 4 is a top plan view of the housing piece of FIG. 3.
Figure 5:
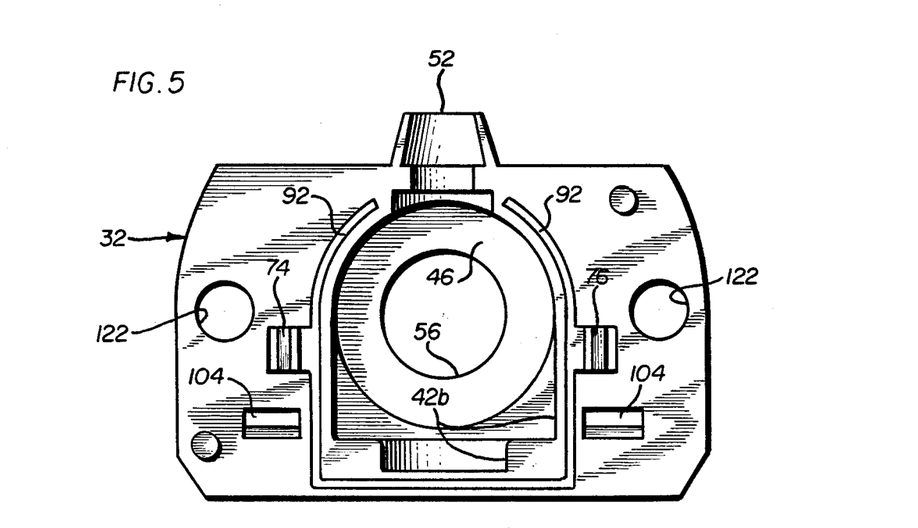
FIG. 5 is a rear or inside elevation of the housing piece of FIGS. 3 and 4.

In accordance with another feature of the invention, the first and second housing pieces include cooperating interlocking tab means and slot means 74, 76 and 78, 80 (see FIGS. 3, 4 and 5). Preferably these interlocking tabs and slots are located closely adjacent the periphery of the second gear-receiving bore 46 for maintaining the housing pieces in assembled condition, and to generally resist spreading apart thereof in response to loading of the respective gears. In the preferred embodiment illustrated the tabs 74 and 76 are projecting, resilient members, which have beveled or ramp-like lead-in surfaces and following rearwardly facing shoulder portions for generally snappingly engaging with slots 78 and 80 which are complementarily formed and located through apertures.

In order to further discourage bending or twisting movement which would occur under load, tending to spread apart the housing halves 30 and 32, additional generally transversely formed elongate strengthening ribs 82, 84 and 86, 88 are formed on the exterior faces or surfaces of the respective housing halves 30 and 32. These ribs are best viewed in FIGS. 3 and 8 respectively. While the tabs 74 and 76 have been shown on housing piece 32 and slots 78 and 80 on housing piece 30, it will be appreciated that this arrangement may be reversed or otherwise varied without departing from the invention, the illustrated embodiment being the preferred form.

In accordance with yet a further feature of the invention, each of the first and second housing pieces include cooperating, interlocking sealing means or members integrally formed therewith. In the illustrated embodiment, these sealing means or members take the form of a raised ridge 90 about the periphery of gear receiving bore 42a of housing piece 30 and a complementary groove 92 formed in housing piece 32 generally surrounding the periphery of gear-receiving bores 42b and 46 therein. These sealing members 90, 92 thus generally tend to seal the gear-receiving bores about their peripheries, generally in the area of the parting line or joining line of the two housing pieces or halves 30, 32.

Advantageously, each of the housing halves 30 and 32 thus far described may be relatively simply and economically formed as a one-piece integrally molded member, of a suitable plastics material.

In accordance with another aspect of the invention, the retainer clip member 34 is also preferably formed as a one-piece integrally molded part from a suitable plastics material. Advantageously, the retainer clip member and the two housing pieces include cooperating assembly means for maintaining the housing pieces in assembled condition, both with each other and with the retainer member. In the illustrated embodiment, these cooperating assembly means include a pair of projecting mounting tabs 100, 102 on the retainer clip 34 and complementary formed and located receiving apertures 104—104, 106—106 in the first and second housing pieces. These apertures 104—104 and 106—106 are aligned so as to receive the elongate tab members therethrough for holding the first and second housing pieces together in a tightly engaged condition to thereby facilitate the sealing action of the sealing means or members 90, 92. As best viewed in FIG. 11, the mounting tabs 100 and 102 have elongate projecting shaft or body portions (shown in phantom line in FIG. 10) which terminate in enlarged head portions 110, 112. Similar to the locking-tabs 74, 76 previously described, these head portions 100, 112 preferably include ramp-like lead-in surfaces and following oppositely facing shoulder portions, the elongate shaft portions thereof providing a resiliency for resilient, snapping engagement thereof through the aligned apertures 104—104 and 106—106.

Moreover, the retainer member 34 includes mounting ear means 114, 116 which are oppositely outwardly extending and include through mounting apertures 118, 120. These ear means and in particular their through apertures are alignable with complementary and aligned through apertures 122—122 and 124—124 in the two housing halves, so as to receive suitable fasteners such as screws 130—130 for attachment of the assembly to the mounting posts 36, 38 as illustrated in FIG. 1.

In accordance with the preferred form of the invention illustrated, the retainer member also includes means 140 for engaging and aligning the adjusting shaft member 26 with the receiving opening 52 and with its mating adjusting gear member 48, for example as illustrated in FIG. 9. As best viewed in FIG. 2, this aligning and engaging means 140 comprises a forwardly projecting body defining a keyhole shaped slot 142 which is centered and aligned, upon assembly of the clip 34 and housing 22, with the opening 52 for this purpose. As best viewed in FIG. 2, the complementary engaging drive means on adjusting shaft 26 and adjusting gear 48 comprise mating male and female TORX(tm)-type drive members 144 and 146. However, other mating components may be utilized without departing from the invention. Preferably, similar mating TORX(tm) drive components (not shown) are provided at the engaged portions of the gear 44 and drive shaft 24 as well as at opposite ends of the respective drive and adjusting shaft members 24, 26 as indicated at 150, 152 in FIG. 1.

In accordance with a further preferred feature of the invention, the retainer clip 34 and the housing 22 include complementary interlocking surfaces or surface portions for assuring both desired alignment thereof upon assembly and for resisting torque or twisting moments imparted thereto in operation. In the illustrated embodiment, these interlocking surfaces include a TORX(tm)-shaped projecting or male surface portion 160 on the housing piece 32 and a complementary internal or female TORX(tm) configuration 162 in the clip 34. Both of these mating interlocking surface configurations are preferably integrally molded with the respective members or pieces 32, 34.

While particular embodiments of the invention have been shown and described, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. An adjusting mechanism for a headlamp or the like, comprising: a two-piece molded housing member having a first housing piece and a second housing piece defining first and second orthogonally disposed gear-receiving bores when the first and second housing pieces are in assembled condition, with said bores generally intersecting at a peripheral location with respect to each other so as to receive respectively a drive gear member disposed in said first gear-receiving bore and an adjusting gear member disposed in said second gear-receiving bore, with the gear members being engageable at the locations where the first and second gear-receiving bores intersect; drive shaft-receiving means defined in said housing pieces for receiving and guiding a drive shaft for engagement with a drive gear received in said first gear-receiving bore and extending outwardly from the housing; adjusting shaft-receiving means defined in said second housing piece for receiving an adjusting shaft for engagement with an adjusting gear received within said second gear receiving bore and extending from said housing for engagement with a headlamp or the like, such that by rotation of the drive gear member, rotational movement will be imparted to the adjusting shaft in response to rotation of the first and second gear members when engaged, said rotational movement being usable to effect adjustment of a headlamp assembly or the like; wherein said first housing piece includes gear retainer wall means extending in the direction of said second gear-receiving bore for holding an adjusting gear member in place within said second gear-receiving bore and wherein said first and second housing pieces include cooperating interlocking tab means and slot means located closely adjacent the periphery of said first gear-receiving bore so as to maintain the housing pieces in an assembled condition and to resist spreading apart thereof in response to loading of the respective gears carried within said gear-receiving bores.

2. An adjusting mechanism according to claim 1 wherein said first and second housing pieces further include elongate, external strengthening ribs integrally formed therewith for substantially preventing bending or twisting deformation thereof when the gears carried therein are in a loaded condition.

3. An adjusting mechanism according to claim 2 wherein each of said first and second housing pieces comprises a one-piece integrally molded member of plastics material.

4. An adjusting mechanism according to claim 1 and further including a one-piece retainer clip member integrally molded from a plastics material and cooperating assembly means on said retainer clip member and on said two housing pieces respectively for maintaining the latter in an assembled condition with said retainer member, said retainer member further having means for aligning said adjusting shaft member with said adjusting gear-receiving opening.

5. An adjusting mechanism according to claim 4 wherein said retainer clip member and said housing include complementary interlocking surfaces for assuring a desired alignment thereof upon assembly and for resisting twisting moments imparted to said retainer clip by an adjusting shaft extending therethrough and into said shaft-receiving means of said second housing piece.

6. An adjusting mechanism according to claim 1 wherein said retainer wall means comprises a pair of projecting members located in generally diametrically opposed locations relative to said adjusting gear-receiving bore.

7. An adjusting mechanism according to claim 4 wherein said cooperating assembly means include mounting tabs formed on said retainer clip and comprising elongate tab members and aligned through receiving apertures in said first and second housing pieces for receiving said elongate tab members therethrough for lockingly engaging said first and second housing pieces in a tightly engaged condition, to further facilitate maintaining said first and second housing pieces in an assembled condition and for holding said adjusting shaft in alignment with the receiving opening therefor in the housing.

8. An adjusting mechanism according to claim 1 wherein said first and second housing pieces include cooperating, interlocking sealing means integrally formed therewith and peripherally surrounding the respective gear-receiving bores for substantially sealing the same against the ingress of moisture, dirt or the like, upon assembly of said two housing pieces.

9. An adjusting mechanism according to claim 8 and further including a one-piece retainer clip member integrally molded from a plastics material and cooperating assembly means on said retainer clip member and on said two housing pieces respectively for maintaining the latter in an assembled condition with each other and with said retainer member.

10. An adjusting mechanism according to claim 9 wherein said cooperating assembly means include mounting tabs formed on said retainer clip and comprising elongate tab members and aligned through receiving apertures in said first and second housing pieces for receiving said elongate tab members therethrough for lockingly engaging said first and second housing pieces in a tightly engaged condition, to further facilitate maintaining said first and second housing pieces in an assembled condition and the sealing means thereof in a sealed condition.

11. A gear box housing for an adjusting mechanism for a headlamp, or the like, comprising: a two-piece molded housing member having a first housing piece and a second housing piece defining first and second orthogonally disposed gear-receiving bores when the first and second housing pieces are in an assembled condition, with said bores generally intersecting at a peripheral location with respect to each other so as to receive respectively a drive gear member disposed in said first gear-receiving bore and an adjusting gear member disposed in said second gear-receiving bore, with the gear members being engageable at the locations where the first and second gear-receiving bores intersect; drive shaft-receiving means defined in said housing pieces for receiving and guiding a drive shaft for engagement with a drive gear received in said first gear-receiving bore and extending outwardly from the housing; an adjusting shaft-receiving opening defined in said second housing piece for receiving an adjusting shaft for engagement with an adjusting gear received within said second gear receiving bore and extending from said housing for engagement with a headlamp or the like, such that by rotation of the drive gear member, rotational movement will be imparted to the adjusting shaft in response to rotation of the first and second gear members when engaged, said rotational movement being usable to effect adjustment of a headlamp assembly or the like; wherein said first housing piece includes gear retainer wall means positioned for surroundingly engaging a portion of a drive gear member and extending in the direction of said second gear-receiving bore for holding a drive gear member and an adjusting gear member in place respectively within said first and second gear-receiving bores.

12. A housing according to claim 11 wherein said first and second housing pieces further include elongate, external strengthening ribs integrally formed therewith for substantially preventing bending or twisting deformation thereof when the gears carried therein are in a loaded condition.

13. A housing according to claim 12 wherein each of said first and second housing pieces comprises a one-piece integrally molded member of plastics material.

14. A housing according to claim 11 wherein said retainer wall means comprises a pair of projecting members located in generally diametrically opposed locations relative to said adjusting gear-receiving bore.

15. A housing according to claim 11 wherein said first and second housing pieces include cooperating, interlocking sealing means integrally formed therewith and peripherally surrounding the respective gear-receiving bores for substantially sealing the same against the ingress of moisture, dirt or the like, upon assembly of said two housing pieces.

16. An adjusting mechanism for a headlamp or the like, comprising: a two-piece molded housing member having a first housing piece and a second housing piece defining first and second orthogonally disposed gear-receiving bores when the first and second housing pieces are in assembled condition, with said bores generally intersecting at a peripheral location with respect to each other so as to receive respectively a drive gear member disposed in said first gear-receiving bore and an adjusting gear member disposed in said second gear-receiving bore, with the gear members being engageable at the locations where the first and second gear-receiving bores intersect; drive shaft-receiving means defined in said housing pieces for receiving and guiding a drive shaft for engagement with a drive gear received in said first gear-receiving bore and extending outwardly from the housing; an adjusting shaft-receiving opening defined in said second housing piece for receiving an adjusting shaft for engagement with an adjustment gear received within said second gear receiving bore and extending from said housing for engagement with a headlamp or the like, such that by rotation of the drive gear member, rotational movement will be imparted to the adjusting shaft in response to rotation of the first and second gear members when engaged, said rotational movement being usable to effect adjustment of a headlamp assembly or the like; a one-piece retainer clip member integrally molded from a plastics material and cooperating assembly means on said retainer clip member and on said two housing pieces respectively for maintaining the latter in an assembled condition with said retainer member, said retainer member further having means for aligning said adjusting shaft member with said adjusting shaft-receiving means.

17. An adjusting mechanism according to claim 16 wherein said first housing piece includes gear retainer wall means extending in the direction of said second gear-receiving bore for holding an adjusting gear member in place within said second gear-receiving bore and wherein said first and second housing pieces include cooperating interlocking tab means and slot means located closely adjacent the periphery of said first gear-receiving bore so as to maintain the housing pieces in assembled condition and to resist spreading apart thereof in response to loading of the respective gears carried within said gear-receiving bores.

18. An adjusting mechanism according to claim 16 wherein said retainer clip member and said housing include complementary interlocking surfaces for assuring a desired alignment thereof upon assembly and for resisting twisting moments imparted to said retainer clip by an adjusting shaft extending therethrough and into said shaft-receiving opening of said second housing piece.

19. An adjusting mechanism according to claim 16 wherein said first and second housing pieces include cooperating, interlocking sealing means integrally formed therewith and peripherally surrounding the respective gear-receiving bores for substantially sealing the same against the ingress of moisture, dirt or the like, upon assembly of said two housing pieces.

20. An adjusting mechanism according to claim 19 wherein said cooperating assembly means include mounting tabs formed on said retainer clip and comprising elongate tab members on said retainer clip and aligned through receiving apertures in said first and second housing pieces for receiving said elongate tab members therethrough for lockingly engaging said first and second housing pieces in a tightly engaged condition, to further facilitate maintaining said first and second housing pieces in an assembled condition and for holding said adjustment shaft in alignment with the opening in the housing provided therefor.

21. A gear box housing for an adjusting mechanism for a headlamp or the like, comprising: a two-piece molded housing member having first and second housing pieces defining first and second orthogonally disposed gear-receiving bores when the first and second housing pieces are in assembled condition, with said bores generally intersecting at a peripheral location with respect to each other so as to receive respectively a drive gear member disposed in said first gear-receiving bore and an adjusting gear member disposed in said second gear-receiving bore, with the members being engageable at the locations where the first and second gear-receiving bores intersect, drive shaft-receiving means defined in said housing pieces for receiving and guiding a drive shaft for engagement with a drive gear received in said first gear-receiving bore and extending outwardly from the housing; an adjusting shaft-receiving opening defined in said second housing piece for receiving an adjusting shaft for engagement with an adjusting gear received within said second gear receiving bore and extending from said housing for engagement with a headlamp or the like, such that by rotation of the drive gear member, rotational movement will be imparted to the adjusting shaft in response to rotation of the first and second gear members when engaged, said rotational movement being usable to effect adjustment of a headlamp assembly or the like; wherein said first and second housing pieces include cooperating interlocking tab means and slot means located closely adjacent the periphery of said first gear-receiving bore so as to maintain the housing pieces in an assembled condition and to resist spreading apart thereof in response to loading of the respective gears carried within said gear-receiving bores.

* * * * *